US007884944B2

(12) United States Patent
Vance

(10) Patent No.: US 7,884,944 B2
(45) Date of Patent: Feb. 8, 2011

(54) TWO-PHOTON-ABSORPTION DISPERSION SPECTROMETER

(76) Inventor: Joseph D. Vance, 316 Sherman Dr., Scotts Valley, CA (US) 95066

(*) Notice: Subject to any disclaimer, the term of this patent is extended or adjusted under 35 U.S.C. 154(b) by 270 days.

(21) Appl. No.: 12/350,195

(22) Filed: Jan. 7, 2009

(65) Prior Publication Data

US 2009/0207407 A1 Aug. 20, 2009

Related U.S. Application Data

(60) Provisional application No. 61/019,764, filed on Jan. 8, 2008.

(51) Int. Cl.
*G01J 3/447* (2006.01)
*G01J 3/45* (2006.01)
*G01B 9/02* (2006.01)
(52) U.S. Cl. ..................... 356/453; 356/327
(58) Field of Classification Search .......... 356/451, 356/453, 484, 327
See application file for complete search history.

(56) References Cited

U.S. PATENT DOCUMENTS

| | | | | |
|---|---|---|---|---|
| 4,040,718 A * | 8/1977 | Bjorklund et al. | ........... | 359/241 |
| 4,105,337 A * | 8/1978 | Bjorklund et al. | ........... | 356/364 |
| 4,165,937 A * | 8/1979 | Murayama et al. | ........... | 356/319 |
| 5,513,032 A * | 4/1996 | Billmers et al. | ........... | 359/244 |
| 5,541,413 A | 7/1996 | Pearson et al. | | |
| 5,654,814 A | 8/1997 | Ouchi et al. | | |
| 5,721,632 A * | 2/1998 | Billmers et al. | ........... | 359/252 |
| 7,058,110 B2 * | 6/2006 | Zhao et al. | ........... | 372/56 |
| 2003/0016432 A1 * | 1/2003 | Terahara et al. | ........... | 359/256 |
| 2003/0215791 A1 | 11/2003 | Garini et al. | | |
| 2005/0078729 A1 * | 4/2005 | Zhao | ........... | 372/56 |
| 2005/0135439 A1 * | 6/2005 | Chapman et al. | ........... | 372/20 |
| 2006/0146340 A1 | 7/2006 | Szwaykowski et al. | | |
| 2009/0207407 A1 * | 8/2009 | Vance | ........... | 356/327 |
| 2009/0207470 A1 * | 8/2009 | Vance | ........... | 359/241 |
| 2010/0231911 A1 * | 9/2010 | Fischer et al. | ........... | 356/364 |

FOREIGN PATENT DOCUMENTS

WO    WO 00/31534 A1    6/2000

OTHER PUBLICATIONS

Chen, H., et al., "Sodium-vapor dispersive Faraday filter", Optics Letters, Jun. 15, 1993, pp. 1019-1021, vol. 18, No. 12, Optical Society of America.
Liao, P. F., et al., "Polarization rotation effects in atomic sodium vapor", Physical Review A, May 1977, pp. 2009-2018, vol. 15, No. 5.
PCT International Search Report and Written Opinion for International Application No. PCT/US2009/030501, mailed Mar. 29, 2009, 10 pages.
PCT International Search Report and Written Opinion for International Application No. PCT/US2009/030504, mailed Mar. 14, 2009, 9 pages.

* cited by examiner

*Primary Examiner*—Patrick J Connolly

(57) ABSTRACT

A tunable optical spectrometer includes a medium configured to perform polarization rotation within a frequency band on a linearly polarized test beam, wherein the medium is circularly birefringent, and wherein the polarization rotation is achieved based on two-photon-absorption. The medium includes a gaseous substance, a first reference laser beam having a first reference frequency, and a second reference laser beam having a second reference frequency, wherein the first reference laser beam and the second reference laser beam have a same circular polarization state.

3 Claims, 4 Drawing Sheets

Potassium spectra

TWO-PHOTON-ABSORPTION DISPERSION SPECTROMETER

RELATED APPLICATION

This application claims the benefit of U.S. Provisional Patent application no. 61/019,764, filed on Jan. 8, 2008 and entitled, "Two-Photon-Absorption Receiver Laser Radar." This application is related to co-pending U.S. patent application Ser. No. 12/350,194, entitled, "Two-Photon-Absorption Optical Filter", filed on Jan. 7, 2009.

FIELD OF THE INVENTION

This invention relates to optical spectrometers utilizing circular birefringence to rotate the linear polarization of light, and more particularly to deducing the photon wavelength based on an analysis of light polarization after propagating light through the circularly birefringent medium.

BACKGROUND OF THE INVENTION

High resolution measurement of light frequency from incoherent sources typically makes use of cavity interference such as Fabry Perot interferometers or etalons, or absorption lines from some medium. Interferometers such as a Fabry Perot or an etalon are expensive and have low acceptance angles, meaning the deviation from the desired angle at which the light enters the interferometer has very little tolerance. Moreover, for such interferometers increasing the spectral resolution lowers the transmission of the signal (reduces the number of photons included in the signal). Absorption line mediums (e.g., iodine, potassium and sodium) require some atomic or molecular transition in the medium, and they only occur at discrete and fixed frequency locations. Additionally, since absorption lines absorb light, they deplete the strength of the signal being measured.

Magneto-optic spectrophotometers can be used to measure frequency, but they only distinguish light near a particular absorption line from light that is not near a particular absorption line, which provides very low frequency resolution in comparison to the current invention.

DETAILED DESCRIPTION OF THE INVENTION

Figure 1:
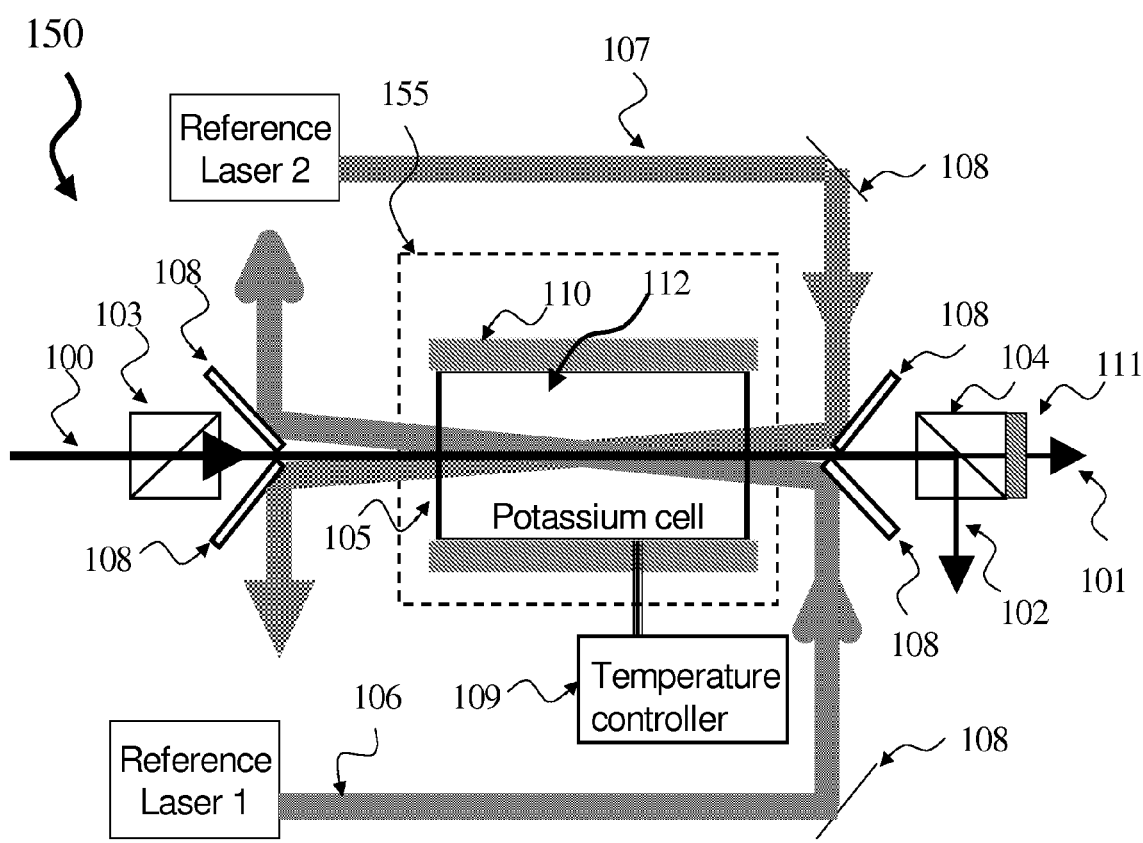
FIG. 1(a) shows a basic configuration of a two-photon-absorption optical spectrometer, in accordance with one embodiment of the present invention.
FIG. 1(b) is a diagram of two-photon-absorption spectra, in accordance with one embodiment of the present invention.
Figure 1:
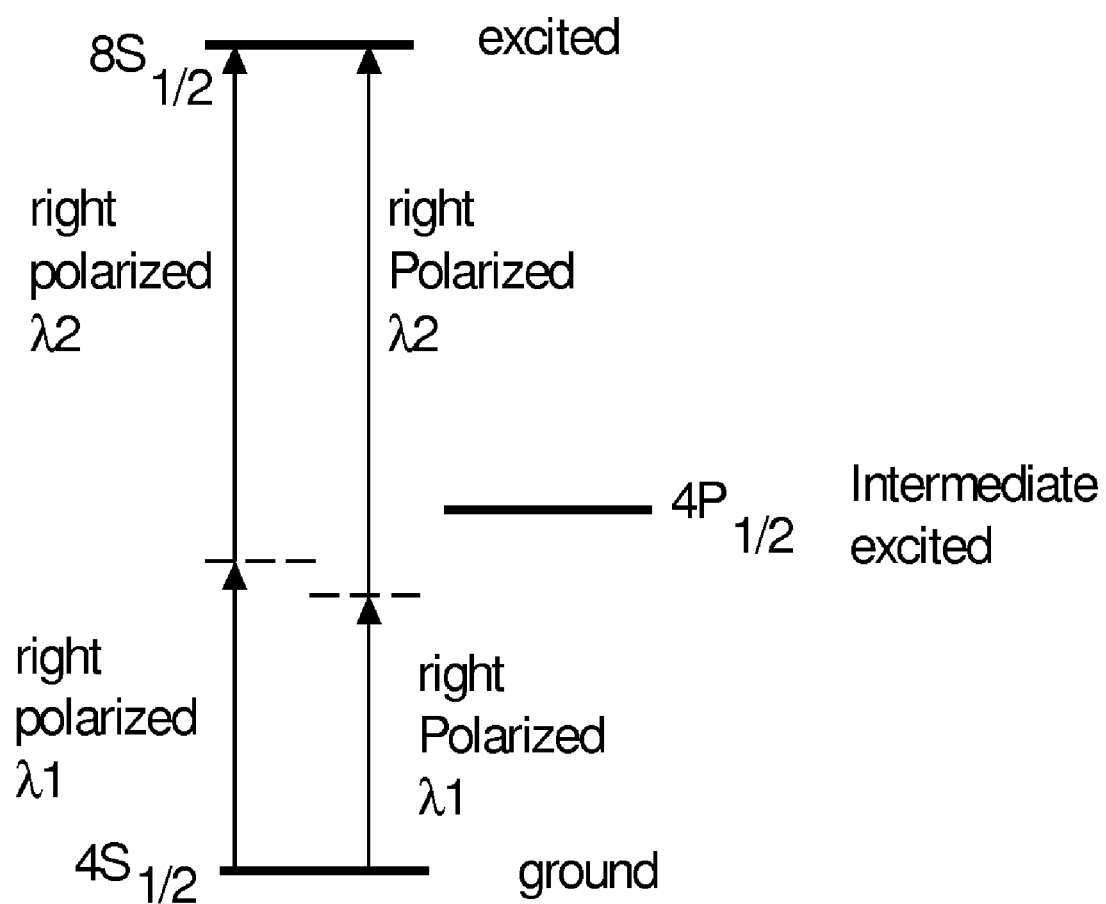

The current invention is an optical spectrometer based on two-photon-absorption. An optical spectrometer measures some property of light, typically intensity as a function of wavelength. A dispersion spectrometer utilizes dispersion (the index of refraction that changes with frequency) to demarcate intensity at a particular wavelength. In one embodiment, the optical spectrometer is a tunable optical spectrometer that includes a medium configured to perform polarization rotation within a frequency band on a linearly polarized test beam. The medium is circularly birefringent, and the polarization rotation is achieved based on two-photon-absorption. The medium includes a gaseous substance, a first reference laser beam having a first reference frequency, and a second reference laser beam having a second reference frequency, wherein the first reference laser beam and the second reference laser beam have a same circular polarization state. In one embodiment, the tunable optical spectrometer includes a linear polarizer configured to linearly polarize the test beam along a polarization axis before the test beam passes through the medium. In a further embodiment, the tunable optical spectrometer includes a polarizing beam splitter configured to receive the test beam after it has passed through the medium and to apportion the test beam into a first beam path and a second beam path, wherein a first probability that a particular photon of the test beam will travel through the first beam path and a second probability that the particular photon will travel through the second beam path are dependent upon orientation axes of polarization of the polarizing beam splitter relative to the polarization axis of the linear polarizer and upon a frequency of the particular photon.

Light to be tested first passes through a linear polarizer, followed by a circularly birefringent medium that changes rapidly with frequency, and then a polarizing beam splitter. The birefringent medium in one embodiment is implemented based on two-photon-absorption. The birefringent medium rotates the polarization of the test beam of light in a direction and amount that is dependent upon the frequency of the light. When the electric field direction of the most substantial linear component of light is rotated, it is referred to as polarization rotation. The polarizing beam splitter can be used to measure the amount and direction of polarization rotation the test beam has undergone so that the frequency of the test beam can be deduced.

Light that propagates through a gaseous medium is preferentially absorbed when its energy corresponds to a particular atomic transition. This preferential absorption (otherwise known as resonance absorption) also affects light phase, or dispersion. The electric susceptibility is used to describe both the absorption and dispersion effects. Whenever the real portion of the electric susceptibility, describing dispersion, for each circular polarization state of light are different, then the medium becomes circularly birefringent (the refractive indexes for each circular polarization component of light is different). It will be shown that the electric susceptibilities for the test beam that manifest from two-photon-absorption in an gaseous medium can be manipulated to bring about circular birefringence that changes rapidly enough to make an ultra high resolution spectrometer.

Several drawings illustrate physical attributes of a two-photon-absorption dispersion spectrometer, and quantities that may be manifested with its construction, in accordance with embodiments of the present invention. Examples are described that have particular gaseous mediums, transitions, wavelengths of complimentary light pairs, etc. for purposes of illustration. However, it should be noted that the choices of particular gaseous medium and particular transitions are abundant. Also, while concomitant to the chosen transitions, the wavelengths of the light pairs, test beam and reference beams have wide latitude of choice upon a continuum. Thus it is recognized that the apparatus and means described herein may vary without departing from the basic underlying concepts of the invention.

FIG. 1(a) illustrates the major components a system 150 that can operate as a narrowband optical spectrometer, in accordance with one embodiment of the present invention. The system 150 includes multiple components that can receive and a test beam 100, and distribute the test beam among two outputs, the distribution depending upon test beam 100. The test beam 100 can be from a target illuminated by a laser, it can be directly from a laser, or it can be from a passive source such as background light. The test beam 100 has a cross section that includes a two dimensional photon flux density that may contain information useful for creating imagery. For instance, laser light might illuminate some object and some of the light reflected from the object may be collected in a telescope. Additionally the test beam 100 contains temporal information that may be utilized. For instance the time of flight of photons from a laser to target to receiver may be recorded and range computed, or an illuminated object may evolve over time. The system 150 includes a circular birefringent medium 155 (a medium having an index of refraction that is different for each circular polarization component of light) that is intermediate between a linear polarizer 103 and a polarizing beam splitter 104. Linear polarizer 103 has a transmission axis (which is the direction of the electric field of the light after transmission through the polarizer). The linear polarizer 103 may be any type, such as Glan-Foucault, Wollaston prism, or absorptive filters. The beam splitting polarizer 104 splits a beam of arbitrary polarization into two beams, each with linear polarization and with electric field direction orthogonal relative to each other. The beam splitting polarizer 104 has a transmission axis for each output beam in the direction of each beam respective electric field. In one embodiment, the polarizing beam splitter 104 is a true polarizing beam splitter with both orthogonal outputs fully polarized such as a Wollaston or a Senarmont prism.

Several of the above described components and/or additional components work together to create a medium in which circular birefringence changes rapidly with frequency. In one embodiment, the circular birefringent medium 155 is composed of portions of gaseous medium/substance 112, first reference beam 106, and second reference beam 107.

In one embodiment, the polarization of test beam 100 will be rotated clockwise or counter clockwise by the birefringent medium 155 depending upon its frequency. When the test beam 100 arrives at the polarizing beam splitter 104, it will preferentially travel through one polarization output channel over the other because of its polarization orientation relative to the polarizing beam splitter. In addition, the relative orientation of linear polarizer 103 to the polarizing beam splitter 104 can be variable. A means of rotating the polarizing beam splitter 104 about a propagation axis of the test beam 100, such as a motorized mount 111, may be implemented. By rotating the polarizing beam splitter 104, The probability distribution of light selection into each output, the first output 101, and the second output 102 can be changed. Changing the probability distribution of light selection into a particular output channel is useful when analyzing a test beam 100 that is itself a distribution of frequencies.

When light of arbitrary polarization is transmitted through a polarizing beam splitter, two outputs emerge (first output 101 & second output 102), each having a linear polarization. The linear polarization of the first output 101 is orthogonal to the linear polarization of the second output 102. Suppose that the orientation of the polarizing beam splitter is 45 degrees relative to the linear polarizer 103. In the absence of the circularly birefringent medium, test beam 100 passes through the linear polarizer 103, and encounters the polarizing beam splitter 104. Upon exiting the polarizing beam splitter 104, the test beam 100 will be evenly split because each output, first output 101 and second output 102, competes equally for photons due to the 45 degree orientation. However, if the test beam 100 travels through the rapidly changing circularly birefringent medium 155, the polarization of the light will be rotated an amount and direction, clockwise or counterclockwise, depending upon its frequency. So light will preferentially choose one exit path or the other, first output 101 or second output 102, of the polarizing beam splitter 104 depending upon the frequency of test beam 100. How the rapidly changing circular birefringent medium rotates the light depending upon frequency is based upon two-photon-absorption, which is examined in detail below.

In one embodiment, the birefringent medium consists of gaseous medium 112 contained within a cell 105, collocated with two reference laser beams (a first reference laser beam 106 and a second reference laser beam 107). The cell 105 has transparent windows through which laser beams may pass. The cell 105 contains an element, such as potassium or iodine at least a portion of which will be in a vapor state. The cell 105 may also contain a buffer gas such as nitrogen, but may otherwise be evacuated.

In one embodiment, the gaseous medium 112 temperature is maintained by a temperature controller 109 and oven 110. An optimum temperature at which to maintain the cell depends on several considerations. With alkali metals, for example potassium or sodium, the density of atoms in a vapor state increases with temperature which also increases the birefringence. However alkali atoms are also very corrosive, and the chemical reaction rate with the cell walls increases with temperature. So increasing the temperature may reduce the useable lifetime of the cell. Other elements such as iodine may have substantial vapor density at room temperature, but the atoms may also be distributed between diatomic and monatomic states. In such a case, increasing the temperature would increase the density atoms in the monatomic state making them available for birefringence. Another impact of temperature, Doppler broadening, is dealt with separately later. These factors show that temperature selection can be a compromise of several factors.

Reference laser beams 106 and 107 may be generated by two separately tunable lasers, the same model appropriate for both beams. Typically a narrow laser line width and high resolution frequency control is desired which would lead to selection of a continuous wave laser. However the power of a continuous wave laser may not be sufficient in some circumstances and a pulsed laser may be selected. The reference laser beam 106 & 107 line width contribute to the overall line broadening of the two-photon-absorption line. The reference laser beams 106 & 107 of one embodiment of the current invention are circularly polarized in a same direction and have slightly different frequency. The difference between the frequency of the first reference laser beam 106 and the second reference laser beam 107 may varied depending upon the situation but is typically between one and six times the full width at half maximum of a two-photon-absorption line, which is described in detail below. The two reference laser beams 106 & 107 may spatially overlap each other and spatially overlap with the test beam 100 as best can be accomplished for the portion of the beam path in the presence of the gaseous medium 112 (inside the cell 105). To produce beam overlap, mirrors of conventional type 108 may be used to steer the beams. Other methods to achieve beam overlap may also be implemented, such as dichroic mirrors.

The direction of travel of the test beam 100 relative to the reference laser beams 106 & 107 may be in the same direction (designated co-propagating), or they may travel in opposite directions (designated counter-propagating). Atoms in motion experience light shifted in frequency called Doppler shifting. The atoms comprising the gaseous medium 112 will have a distribution of velocities, and each individual atom has its own Doppler shift. Since the distribution of velocity follows a Gaussian shape, there will be a Gaussian contribution to the overall broadening of the absorption line shape referred to as Doppler broadening. If the beams are in a co-propagating configuration, Doppler broadening of the two-photon-absorption line width will be wider, because the Doppler shift of each beam due the motion of atoms will have the same sign and be additive, growing the shift. If the beams are in a counter-propagation configuration, the Doppler broadening of the two-photon-absorption line will be narrower because the Doppler shift of each beam due to the motion of the atoms will be opposite, mitigating the effect. In FIG. 1(a), the test beam is shown in a counter-propagating direction relative to the reference beams, but this invention encompasses the co-propagating orientation as well.

Beam processing elements such as lenses and wave plates for shaping and for polarization of the reference laser beams 106 & 107 may also be implemented, but are not shown or clarity. For example, a quarter wave plate of conventional type may be required to change the reference laser beam polarization state from linear polarization into circular polarization. Lenses may be required to collimate the reference laser beams 106 & 107 and test beam 100.

The circular birefringent medium 155 accomplishes circular birefringence based on a physical phenomena called two-photon-absorption. Consider an atomic transition from a ground state (lowest allowed energy state of an atom) to an intermediate excited state which can occur with the absorption of a single photon. A single photon resonance is a photon frequency bandwidth where the energy of the photon matches an allowed atomic transition. Furthermore, consider another transition from the intermediate excited state to another still higher energy state, a final excited state which can occur with the absorption of a single photon. Two-photon-absorption is the direct transition from the ground state to the final excited state, avoiding the intermediate state, by the simultaneous absorption of two photons. A two-photon-transition identifies the states of the substance involved in two-photon-absorption. A two-photon-absorption line is a frequency bandwidth of light that can be absorbed by the process of two-photon-absorption. FIG. 1(b) is a diagram illustrating the process of two-photon-absorption, in accordance with one embodiment of the present invention.

In the case of two-photon-absorption, the only restriction upon the energy of the photons is that the sum of their energies match the total energy of the atomic transition:

$$E_{excited} - E_{ground} = \frac{hc}{\lambda_1} + \frac{hc}{\lambda_2} \qquad \text{Equation 1}$$

Here, $\lambda_1$ refers to the combined wavelengths of the first reference laser beam 106 and the second reference laser beam 107, acting in conjunction with the gaseous medium to rotate the test beam 100. $\lambda_2$ refers to the wavelength of the test beam 100 to be rotated. Equation (1) demonstrates that there is some freedom of choice of wavelengths $\lambda_1$ & $\lambda_2$. Conservation of energy requires only that the sum of the two photon energies match the two photon transition, which is a considerably relaxed condition compared to a sequential transition, where each photon energy individually matches the transition energy. The wavelength of the test beam 100 may be tuned by complimentary tuning each reference beam 106 & 107 in concert, in accordance with equation (1). If the test beam 100 wavelength $\lambda_2$ is chosen arbitrarily, the probability of the interaction may be quite low. When the $\lambda_1$ photon energy is close to the energy required to make a transition from the ground state to the intermediate excited state, there is an increase in the probability of two-photon absorption. This increase in probability is referred to as resonance enhancement. In the absence of resonance enhancement, other methods of increasing the absorption probability may be utilized including increasing reference laser intensity and/or vapor density.

An example of a spectra and photon combination that may be constituents of an instance of the present invention follows, in accordance with one embodiment of the present invention. Atomic potassium, for example, may be the chosen vapor within cell 105, utilizing the $4S_{1/2}$->$4P_{1/2}$->$8S_{1/2}$ two-photon-absorption transition. In the notation, the state is identified by a number, followed by a letter and another number. The first number is the principle quantum number, the letter quantifies the orbital angular momentum, and the third quantity is the sum of orbital angular momentum and spin angular momentum. The reference laser wavelength may be near the $4S_{1/2}$->$4P_{1/2}$ transition wavelength of 769.9 nm. A Ti Sapphire laser may be chosen to produce light at the reference wavelength. The test light wavelength may be near the $4P_{1/2}$->$8S_{1/2}$ transition wavelength of 532.33 nm. These transitions are illustrated in FIG. 1(b).

This example of an embodiment of the present invention is designed to be a high resolution spectrometer for doubled Nd:YAG, an acronym for: Neodymium doped Yttrium Aluminum Garnet laser light. The peak of the gain range for this laser is centered at 532.07 nm with a tuning range on either side of 0.24 nm. A two-photon-absorption line, and thus a transmission band, may be created within the tuning range of doubled Nd:YAG. One choice of test beam wavelength may be 532.23 nm, a wavelength different from a single photon resonance of one Angstrom. This line is chosen for demonstration. In one embodiment, any wavelength within the gain range of the doubled Nd:YAG may be used. Tuning of the test beam 100 wavelength for which the optical spectrometer is sensitive can be accomplished by tuning the wavelength of the reference beams 106 & 107 in concert. Additionally, while an optical spectrometer for Nd:YAG is used for demonstration, the gain range poses no restriction on the choice of test beam 100 wavelength. Furthermore, the choice of gaseous medium 112 and spectra for the current invention are not limited by this example, and any gaseous medium and spectra can be chosen.

Under increasingly higher resolution a spectral absorption line, or frequency bandwidth of preferential absorption due to photon energy coinciding with transition energy of the absorber, including two-photon-absorption lines that appear initially discrete begins to show width and becomes a distribution. A two-photon-absorption line distribution may be broadened by a variety of processes and is designated a Voigt function or line shape function. The Voigt function is a correlation integral of homogeneous (Laurentzian) and inhomogeneous (Gaussian) broadening processes. Typically, most of the broadening is due to Doppler shifting from the individual motion of atoms in the vapor. The two-photon-absorption line for the test beam 100 is a Voigt function.

The reference laser beams 106 & 107 propagation direction relative to the signal beam is one determining factor of the width of the Doppler broadening, and impacts the two-photon absorption line, a Voigt function. If the reference laser beams 106 & 107 propagate in the same direction as the test beam 100, the Doppler effect is additive and the line is broadened. If the reference laser beams 106 & 107 propagate in the opposite direction as the signal beam 100, the Doppler effect is partially cancelled and the line width is reduced. The Doppler broadening can be completely eliminated in the special case where pass band and reference laser wavelengths are equal. The Gaussian function describing the Doppler broadening of two-photon-absorption is:

$$g(v') = C\exp\left[-\frac{M}{2kT}\left(\frac{\lambda_1 \lambda_2}{\lambda_1 \pm \lambda_2}\right)^2 \left[v' - \frac{E_0}{h}\right]^2\right] \quad \text{(Equation 2)}$$

Where v' is the sum of the frequencies of the reference and pass band light, $E_o$ is the total energy required for the two-photon transition, h is Planck's constant, C is the normalization constant, M is the mass of a vapor atom, k is Boltzmann's constant, T is the temperature in Kelvin, and $\lambda_1$, and $\lambda_2$ are the wavelengths of the reference and pass band light respectively. The plus sign corresponds to co-propagating beams and the minus sign corresponds to counter-propagating beams.

Practical two-photon-absorption involves the rigid application of angular momentum selection rules. Because of the angular momentum restriction upon two-photon-absorption, the polarization states of both reference and pass band beam can be determinative of filtering results. In units of h, all photons have an angular momentum. Since angular momentum is a vector, it has magnitude and direction. A photon with right handed circular polarization has an angular momentum direction opposite to the propagation direction, and a magnitude of one. A photon with left handed circular polarization has an angular momentum direction in the same direction as the propagation direction, and a magnitude of one. Circularly polarized light is in a stationary or eigen state. Linearly polarized light on the other hand has angular momentum of one, but the direction is in a super position of eigen states. Upon absorption of a photon the angular momentum vector is transferred into the system that absorbs it. But in the case of linearly polarized light, the direction of the transferred angular momentum vector is equally likely to be in the forward direction as the backwards direction.

For atomic dipole transitions, or allowed transitions, there is a change in magnitude of angular momentum between the initial state and final state of one, with the emission or absorption of a single photon. Consider a sequence of two dipole transitions of an atom. Beginning with lowest energy state of the atom, the ground state, a transition can occur to an excited state, denoted here as an intermediate excited state, with an absorption of a photon. Then another transition can occur from the intermediate excited state to a final excited state with another photon absorption. By vector addition, angular momentum that the ground state and the final excited state have may differ by zero or two (e.g., 1−1=0; 1+1=2). Now consider the same situation except that instead of sequential absorption of two photons there is simultaneous absorption of two photons, denoted two-photon-absorption. If the angular momentum of the atom's ground state and final excited state are identical, then two-photon-absorption can occur only with a photon pair that have angular momentum vectors aligned in opposite directions. Similarly, if the angular momentum of the atom's ground state and the final excited state differ by two, then two-photon-absorption can occur only with a photon pair that have angular momentum that is aligned in the same direction. Extrapolating from single photons to beams, all the photons of a circularly polarized beam of light have their angular momentum vectors aligned in the same direction.

The selection rules can now be demonstrated in an example using the spectra stated above. The angular momentum of the ground state and the final excited state in the example spectra are the same. Observe that the pass band beam 101 is linearly polarized after passing the first linear polarizer 103, and that linear light can be expressed in a circular polarization basis as equal components of left and right circularly polarized light. The reference laser beams 106 & 107 are polarized in the same circularly polarized state. The circularly polarized reference laser beams 106 & 107 can only pair up for two-photon-absorption with the circularly polarized component of the test beam 100 that has an angular momentum vector aligned opposite to that of reference laser beams 106 & 107. The other circularly polarized component of test beam 100 cannot be absorbed via two-photon-absorption because conservation of angular momentum would be violated.

The birefringent medium 155 has an electric susceptibility (the physical characteristic quantifying absorption and dispersion) that is responsible for the birefringence, and is defined here in terms of dielectric polarization density:

$$P = \epsilon_o \chi E \quad \text{Equation 3}$$

Where the electric susceptibility $\chi$ is the proportionality constant linking the electric field of the test beam 100 to the dielectric polarization, and $\epsilon_o$ is the permittivity of free space. The electric susceptibility $\chi$ is dimensionless and also a complex quantity, and is expressed in component form as:

$$\chi = \chi' + i\chi'' \quad \text{Equation 4}$$

Assuming initial linear polarization of the test beam 100, with some minor approximations, and removing time dependence, the electric field of the test beam 100 after traveling a distance l within the gaseous medium 112 is:

$$\vec{E}(l) = -\frac{E_o}{2}\exp\left[i\left\{\frac{\omega}{c}\left(1 + \frac{\chi'_+}{2} + i\frac{\chi''_+}{2}\right)l\right\}\right]\hat{+} + \frac{E_o}{2}\exp\left[i\left\{\frac{\omega}{c}\left(1 + \frac{\chi'_-}{2} + i\frac{\chi''_-}{2}\right)l\right\}\right]\hat{-} \quad \text{Equation 5}$$

Where $\omega$ is the angular frequency and c is the speed of light. Equation (5) demonstrates that $\chi'$, the real portion of the electric susceptibility, affects phase, while $\chi''$, the imaginary portion of the electric susceptibility, is related to absorption. The subscripts, plus and minus, attached to the susceptibilities identifies to which circular polarization state the electric susceptibility applies to: right and left handed polarization, respectively. Notice that the field vector is written in a circular polarization basis.

Figure 2A:
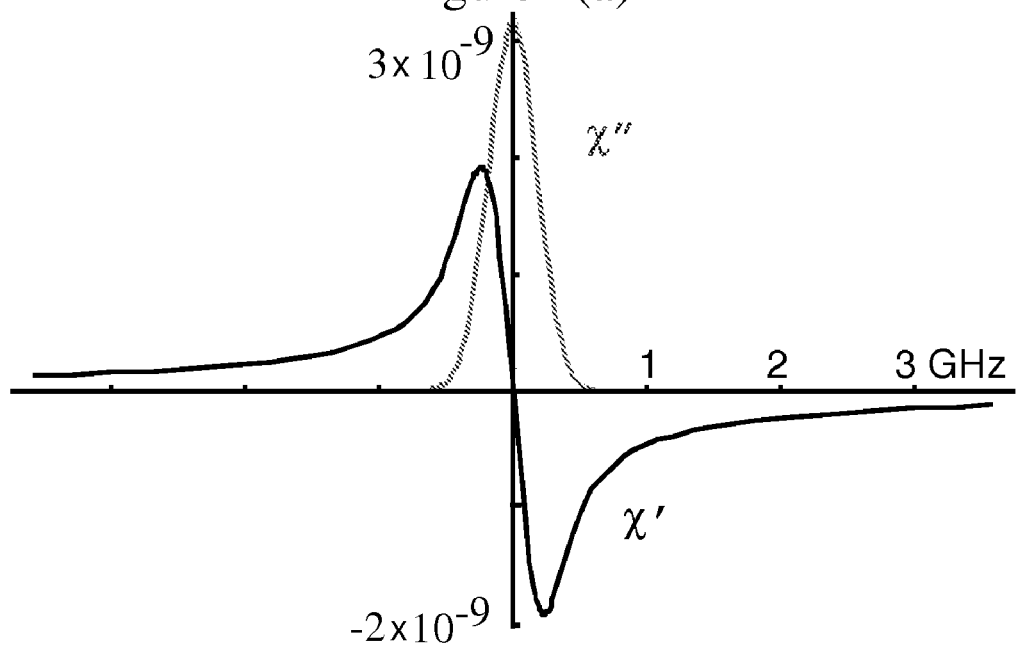
FIG. 2(a) shows the relationship between the real ($\chi'$) and imaginary ($\chi''$) portions of the electric susceptibility near an absorption line in an gaseous medium such as potassium, in accordance with one embodiment of the present invention.

FIG. 2(a) shows the electric susceptibility for a gaseous medium and how the real and imaginary portions of the electric susceptibility relate to each other. In this case the imaginary portion of the electric susceptibility $\chi''$ and line shape of two-photon-absorption in potassium are represented by the same curve, to within a constant, as shown. The dispersion portion, the real portion of the electric susceptibility $\chi'$, can be calculated directly from the imaginary portion of the electric susceptibility.

Define a coordinate system with $\hat{z}$ assigned to the test beam 100 propagation axis and $\hat{x}$ assigned to the direction of polarization after passing through the linear polarizer 103. If the polarizing beam splitter is oriented 45 degrees relative to the linear polarizer 103, the first output 101 and second output 102 polarization directions can be expressed as $\hat{x}\pm\hat{y}$ respectively. The transmission of test beam 100 into first output 101 and second output 102 will be:

$$T = \frac{\left|\vec{E}\cdot\left(\frac{\hat{x}\pm\hat{y}}{\sqrt{2}}\right)\right|^2}{E_o^2} \qquad \text{equation 6}$$

$$T = \frac{1}{4}\left[\begin{array}{c} \exp\left(-\frac{\omega}{c}\chi''_+ l\right) + \exp\left(-\frac{\omega}{c}\chi''_- l\right) \pm \\ 2\exp\left(-\frac{\omega}{c}\frac{\chi''_+ + \chi''_-}{2}l\right)\mathrm{Sin}\left(\frac{\omega}{c}\frac{\chi'_+ - +\chi'_-}{2}l\right)\end{array}\right] \qquad \text{equation 7}$$

Further simplification results when it is observed that electric susceptibility for one polarization state is chosen to be zero because both reference lasers are circularly polarized in the same direction.

Figure 2B:
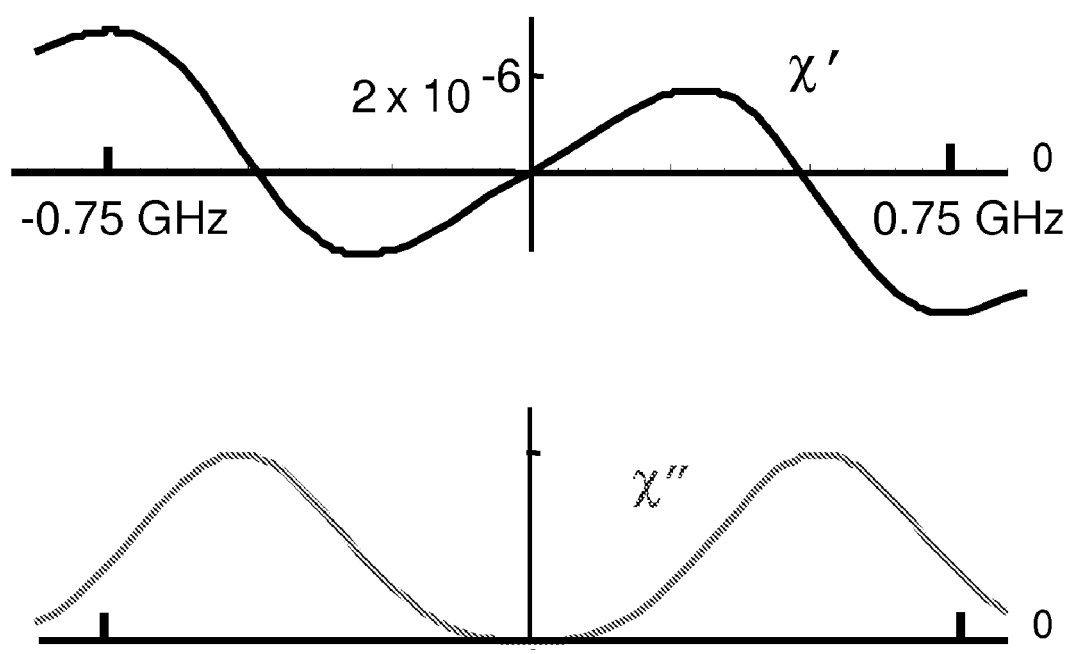
FIG. 2(b) is a plot of real and imaginary portions of the electric susceptibility in potassium near an absorption line that can be used to build a rapidly changing circularly birefringent medium to rotate the polarization of a test beam, in accordance with one embodiment of the present invention.

It is now instructive to look at electric susceptibility and transmission curves corresponding to one embodiment of the current invention. FIG. 2(b) shows both the real and imaginary portions of the electric susceptibility for the test beam 100 with example values for reference beam 106 & 107 intensities of two Watts divided by a beam cross sectional area of 0.0012 cm$^2$. The separation in frequency of the reference laser beams 106 & 107 is 1.1 GHz. The gaseous medium 112 is constituted of potassium with a temperature of 400 K, in accordance with one embodiment of the present invention. As shown, there are three zero crossings of the real portion of the electric susceptibility. Only the center zero crossing occurs where there is no absorption. Since both reference lasers are circularly polarized in the same direction, the electric susceptibility is zero for one polarization state of the test beam 100. Thus, there is a rapidly changing difference in electric susceptibility for each circular polarization state, without absorption near the center zero crossing. When the electric field direction of the most substantial linear component of light is changed, it is referred to as polarization rotation. The direction of polarization rotation for the test beam 100 depends upon the sign of the difference in electric susceptibility for each polarization state. Thus, on either side of the center zero crossing, the test beam 100 polarization will rotate in opposite direction.

A frequency separation value, the difference in frequency between reference laser beam 106 and reference laser beam 107 will affect the sensitivity bandwidth (frequency region over which spectrometer is useful) and the frequency resolution of the optical spectrometer. Referring to FIG. 2(b), the imaginary portion of the susceptibility, related to absorption is represented by the bottom curve. The optical spectrometer is sensitive only in the region between absorption bands. Since the optical spectrometer distinguishes frequency by separating the beam into only two separate channels, the broader the sensitivity bandwidth the lower the frequency resolution. Because of the interdependence between the real and imaginary portions of the susceptibility, it is convenient to assign a frequency separation value in terms of the imaginary portion of the susceptibility. Visually it can be seen from the bottom curve of FIG. 2(b) that the frequency separation value is the frequency difference between the two peaks, which is about three times the full width at half maximum of the peaks.

Figure 3A:
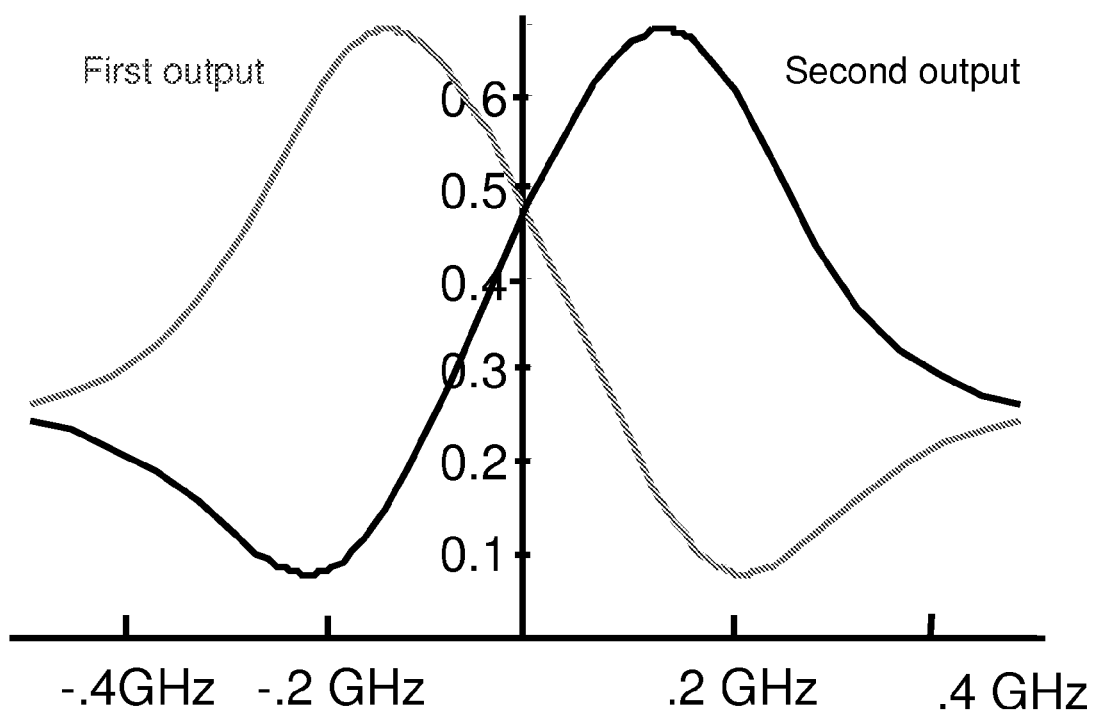
FIG. 3(a) is the transmission spectrum arising for the first output and second output of a two-photon-absorption spectrometer that may be built utilizing the electric susceptibility shown in FIG. 2(b), in accordance with one embodiment of the present invention.

Given the electric susceptibility described above and a cell length of six inches, an optical spectrometer can be built with transmission curves as shown in FIG. 3(a), in accordance with one embodiment of the present invention. Vapor cell 105 length, gaseous medium 112 temperature, and first reference beam 106 and second reference beam 107 intensity and frequency separation are theoretical values used to demonstrate the curves in FIG. 2(b) and FIG. 3(a). In practice these values can be adjusted without limitation. As is evident from FIG. 3(a), if the signal magnitude of the first output 101 is divided by the signal magnitude of the second output 102, the ratio can determine the frequency of the light by comparing to a curve generated by dividing first output 101 by second output 102 shown in FIG. 3(a). In this way the spectrometer can be used to demodulate information from frequency modulated laser beams. A laser communication system can be built by frequency modulating a communication signal upon the test beam 100, and transmitting it to a receiver containing a demodulator to decode the information as described above.

Another use for the spectrometer is to recover the shape of the test beam 100 when it is a distribution of frequencies. Consider that test beam 100 may begin as a laser beam or laser pulse with known frequency distribution and then is scattered off of some object that changes the frequency distribution. Or the test beam may just have an unknown frequency distribution. Further consider that each first output 101 and second output 102 are an integration of the distribution of test beam 100 multiplied by the probability of capture into a particular output, integrated over frequency. If the test beam 100 is tuned, and or the reference beams 106 & 107 are tuned in concert, while recording the photon flux from each of first output 101 and second output 102 at each frequency point along the tuning path, then a frequency scan is produced. At each frequency point along the scan, the photon flux represents an integration or transform over a different portion of the test beam 100 distribution. The distribution of test beam 100 can then be recovered by comparisons of frequency scan from test beam 100 to frequency scans from known beam shapes.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A tunable optical spectrometer, acting upon test light, comprising:
    (a) a gaseous substance;
    (b) circularly polarized light of a first frequency;
    (c) circularly polarized light of a second frequency;
    wherein the gaseous substance and the circularly polarized light of the first frequency and the circularly polarized light of the second frequency combine to form a birefringent medium for the test light;
    wherein the test light propagates through the birefringent medium;

wherein the birefringent medium changes the polarization of the test light such that the change is dependent upon test light frequency.

2. The tunable optical spectrometer of claim 1, further comprising:

a means of determining the polarization state of the test light after it has been changed by the birefringent medium.

3. The tunable optical spectrometer of claim 1, further comprising:

a polarizing beam splitter;

wherein the polarizing beam splitter accepts the test light after it has been changed by the birefringent medium, and splits the test light into two separate propagation directions, apportioning the test light into a first output beam and a second output beam; and wherein the relative magnitude of the first output beam to second output beam determines the polarization state of the test light.

* * * * *